Patented Mar. 26, 1940

2,194,994

UNITED STATES PATENT OFFICE 2,194,994

SOLVENTS FOR THE CONDENSATION PRODUCTS OF POLYVINYL ALCOHOLS AND ALDEHYDES

Maurice Belloc, Paris, France, assignor to Societe Nobel Francaise, Paris, Seine, France, a joint-stock company of France No Drawing. Application November 17, 1937, Serial No. 175,141. In France July 25, 1935

8 Claims. (Cl. 260—23)

The present application is a continuation in part of application Serial No. 86,023, filed June 18, 1936 for Solvents for synthetic resins.

The present invention concerns solvents for the condensation products of polyvinyl alcohols and aldehydes. It also concerns the processes of manufacture of such solvents, as well as the industrial products obtained by means of said solvents.

An object of the present invention is to provide compositions of condensation products of polyvinyl alcohol and aldehydes for use in molding, coating and forming sheets.

A further object is to provide non-toxic and non acid-forming solutions of the condensation products of polyvinyl alcohol and aldehydes.

Another object is to provide a solvent and solution of the said condensation products which may be combined with natural resins or cellulose acetate.

The condensation products of the type of polyvinyl formal, polyvinyl aceto-formal and polyvinyl acetal, and in particular the first two named, are finding increasing favor in the field of synthetic resins. These substances may be used for the manufacture of coating compositions such as varnishes, dopes or sizings. Photographic films and wrapping or ornamental sheets may likewise be prepared by formation from solutions as is the case with other known resins. Various plastic bodies in block, rod or tube form are other available products.

It is known to prepare such condensation products by combining polyvinyl alcohol with formaldehyde or acetaldehyde, or with mixtures in suitable proportions of these two aldehydes, (see for example French Patent No. 750,350 of April 20, 1932, and French Patent No. 777,251 of October 20, 1933).

Said condensation products, which moreover, possess very interesting properties have, however, certain drawbacks. For example, the condensation products of polyvinyl alcohols and formaldehyde do not dissolve in current organic solvents, they only dissolve in methylene chloride, chloroform and a few other solvents of the same kind. Similarly, the condensation products of polyvinyl alcohols and mixtures of acetaldehyde and formaldehyde only dissolve in complex solvents, preferably containing an alcohol and a benzene hydrocarbon.

The present invention presents single solvents in which polyvinyl formals and aceto-formals readily dissolve, said solvents being derived from glycol and probably composed of cyclic formals or acetals of ethylene glycol. The invention contemplates particularly a solvent for the condensation products of polyvinyl alcohols and aldehydes and in particular the three following products: polyvinyl acetal, formal and aceto-formal. Said solvents are prepared in a general manner by the action of ethylene glycol or of ethylene oxide or their homologues, on formaldehyde or acetaldehyde or their polymers, in the presence of acids, or of certain metallic salts such as ferric chloride.

The following examples which are in no way limitative will give a better understanding of the characteristics of the solvents:

EXAMPLE I 1 molecule and a half of ethylene glycol,
1 molecule of trioxymethylene,
are mixed with 1% by weight of phosphoric acid having a density of 1.70. The mixture is heated to boiling point the disappearance of the formaldehyde being followed by means of the classical analytical methods. When the formaldehyde content no longer decreases, the mixture is rectified, which separates the water and the excess of glycol. In the distillate, the excess of free formaldehyde which may be present is eliminated by the known processes. The resulting liquid is treated with calcium chloride and rectified a second time. A cyclic acetal of glycol is obtained which probably has the formula:

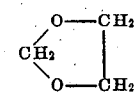

and which boils at about 78° C.

This liquid is an excellent solvent for the condensation products of polyvinyl alcohol and formaldehyde. It enables in particular varnishes, films, transparent sheets for packing, plastic materials, in blocks, in sticks, or in tubes to be prepared by means of the known processes. Said solvent has numerous advantages over the chlorinated solvents. In the first place, it is not toxic, in the second place its boiling point is not too low, which makes it possible to use it for the preparation of varnishes, plastic materials in sticks or in tubes, in the third place said solvent is quite neutral, consequently it does not introduce into the manufactured product any trace of acidity, which in numerous cases is an incontestable advantage.

Example II

Ethylene glycol 1 molecule and a half,
Acetic paraldehyde 1 molecule,

Phosphoric acid having a density of 1.70: 2% by weight, are mixed and brought to boiling point. When the liquid has become homogeneous in the hot state, a further 1% of phosphoric acid having a density of 1.70 is added. The mixture is heated to boiling point for 10 hours; after that the reactional medium will be homogeneous in the cold state. The mixture is rectified to separate the desired product from the water and from the excess of glycol. It is treated with calcium chloride as in Example I and rectified. What passes between 80 and 85° C. is collected. This product is mainly composed of a cyclic acetal of ethylene glycol, probably having the following formula:

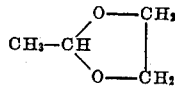

Said product is an excellent solvent for the mixed condensation products of polyvinyl alcohol, formaldehyde and acetaldehyde. It has, with respect to the solvent mixtures described in the patent of addition No. 44,809 of November 17, 1933 to French Patent No. 777,251 of October 20, 1933, the following advantages:

1. It is not toxic, as are in a general manner the benzene hydrocarbons which come into question most frequently in the aforesaid patent of addition.

2. It has a constant rate of evaporation, whereas the mixtures which come into question in the aforesaid patent of addition evaporate with more or less regularity, according to their composition.

Said solvent enables, as does the previous one, varied solutions, varnishes, films, plastic materials in blocks, sheets, tubes or sticks, to be prepared by means of the condensation products of polyvinyl alcohol and a mixture of formaldehyde and acetaldehyde.

The cyclic formal of glycol is an excellent solvent for the polyvinyl formals, polyvinyl aceto-formals and polyvinyl acetals. It is of particular use in dissolving the polyvinyl formals. In fact, the only practical solvents previously known for these formals are halogenated: for instance, chloroform, methylene chloride. These solvents have numerous drawbacks, as before mentioned, in that they are toxic and they hydrolyze to give free hydrochloric acid. This freeing of hydrochloric acid is a very serious drawback where the solutions of polyvinyl formals are to be used, for example, in the manufacture of cinematographic films. In fact, photographic emulsions lose their sensitivity in the presence of even minute traces of a mineral acid. The same objection applies to the use of these colloids for the manufacture of coatings for cellulosic fabrics. The hydrochloric acid set free by the halogenated solvent transforms the cellulose into hydrocellulose thus completely destroying the strength of the fabrics.

The cyclic acetal of glycol which has been described does not dissolve the polyvinyl formals. On the other hand, it dissolves the aceto-formals and the acetals perfectly well. While other simple or mixed non-halogenated solvents are known for these aceto-formals and acetals the cyclic acetal of glycol has the advantage of being relatively cheaper and in the case of the aceto-formals it is possible to avoid the use of large amounts of alcohol which is frequently a serious drawback in preparing the products of this resin. The solvent has also the advantage of being non-toxic.

The cyclic formals and acetals of glycol are not usually used alone with the resins. Particularly in varnish making it is recognized that a number of solvents having different boiling points must be used in order to obtain varnishes with proper drying characteristics. Furthermore, the present solvents dissolve the vinyl resins still better when a certain percentage of aliphatic alcohol such as methanol or ethanol, is added. These additions of alcohol are not absolutely necessary but fulfill the purpose of producing less viscous solutions which have less gelatinous structure.

An additional advantage of the cyclic acetals and formals of glycol is their property of dissolving natural resins and cellulose acetate. By reason of this property it is possible to combine a vinyl resin varnish with a cellulose acetate varnish which is very difficult with ordinary processes since neither acetone nor methyl acetate dissolves the polyvinyl formals or aceto-formals.

In forming solutions of these particular resins and solvents ordinary commercial apparatus is used. A mixer is used for very thick colloids and a mixing drum for varnishes.

While the extent of application of solutions of these resins and solvents is impossible of limitation a few specific compositions are given hereunder. Characteristic compositions are set out for coating compositions, film producing compositions, wrapping sheet compositions, a composition for producing plastic masses, and a solution for producing a textile coating compound.

Example A

Varnish comprising polyvinyl formal

|   | Grams |
|---|---|
| Low viscosity polyvinyl formal | 525 |
| Ethylparatoluenesulfamide | 30 |
| Tricresylphosphate | 15 |
| Powdered aluminium | 50 |
| Solvent | 6,100 |

The solvent has the following composition:

|   | Grams |
|---|---|
| Cyclic formal of glycol | 525 |
| Ethylglycol | 50 |
| Ethyl alcohol | 190 |
| Butyl acetate | 165 |
| Ethyl lactate | 45 |

It is to be noted that the solvent mixture is a complex containing substances having different boiling points, as is generally made for varnishes. The only compounds which dissolve polyvinyl formals in the above solvent composition are glycol formal and ethyl lactate, the other products being diluents. Ethyl lactate is not good as a general solvent for the polyvinyl formal because of its boiling point which is much too high for ordinary purposes.

EXAMPLE B

Varnish comprising polyvinyl aceto-formals

| | Grams |
|---|---|
| Low viscosity polyvinyl aceto-formal | 200 |
| Ethylparatoluenesulfamide | 12 |
| Butyl phthalate | 7 |
| Colored pigment | 25 |
| Ethyl alcohol | 135 |
| Toluene | 260 |
| Cyclic acetal of glycol | 410 |

In this composition the function of the toluene is to reduce the cost price, and the function of the ethyl alcohol is to reduce the sticky structure of the solution of polyvinyl aceto-formal in cyclic acetal of glycol.

EXAMPLE C

Dope for film manufacture comprising polyvinyl formal

| | Grams |
|---|---|
| High viscosity polyvinyl formal | 200 |
| Cyclic formal of glycol | 800 |
| Methanol | 70 |
| Pure hydroquinone | 0.4 |

The colloid obtained is filtered and spread on the usual machines with a thickness of 15/100 mm. (dry product).

The purpose of the methanol is to reduce the viscosity of the solution, and the purpose of the hydroquinone is to stabilize the polyvinyl formal.

EXAMPLE D

Films comprising polyvinyl aceto-formal

| | Grams |
|---|---|
| High viscosity polyvinyl aceto-formal | 250 |
| Cyclic acetal of glycol | 750 |
| Methanol | 50 |
| Pure pyrogallol | 0.2 |

The purpose of the methanol is the same as in the previous example, and the purpose of the pyrogallol is to stabilize the vinyl resin.

EXAMPLE E

Wrapping sheets comprising polyvinyl formal

| | Grams |
|---|---|
| Medium viscosity polyvinyl formal | 200 |
| Ethyl paratoluenesulfamide | 80 |
| Glycol formal | 1,100 |

The ethylparatoluenesulfamide acts as a plastifier. The solution is filtered and spread as for Cellophane. Of course, it is not necessary to desulphur this composition after spreading.

EXAMPLE F

Plastic masses comprising polyvinyl formal

| | Grams |
|---|---|
| High viscosity polyvinyl formal | 5,000 |
| Colored pigment | 310 |
| Glycol formal | 4,000 |
| Methyl-glycol | 300 |
| Ethyl alcohol | 800 |

A homogeneous solution of the product of this formula is prepared in a mixer, the slurry obtained is filtered under high pressure (150 kg./cm.²) on a wire gauze covered with cambric. The material is rolled, compressed, cut into sheets and dried with the apparatus generally used for making Celluloid.

EXAMPLE G

Plastic masses for coating textiles

| | Grams |
|---|---|
| High viscosity polyvinyl aceto-formal | 2,000 |
| Ethylparatoluenesulfamide | 1,040 |
| Butyl phthalate | 600 |
| Methyl phthalate | 240 |
| Cyclic acetal of glycol | 3,000 |

The material is dissolved in a mixer. The mixture is highly plastified and is used on the spreading machine as a rubber solution.

EXAMPLE H

Varnish comprising polyvinyl acetal

| | Grams |
|---|---|
| Low viscosity polyvinyl acetal | 17.5 |
| Ethanol | 7.8 |
| Cyclic acetal of glycol | 44 |
| Toluol | 9.3 |
| Butyl phthalate | 4 |
| Castor oil | 1.5 |
| Zinc oxide | 15 |

EXAMPLE I

Coating composition for textiles, comprising polyvinyl acetal

| | Grams |
|---|---|
| High viscosity polyvinyl acetal | 225 |
| Pentachlorodiphenyl | 525 |
| Cyclic formal of glycol | 405 |
| Methanol | 45 |

The above Examples A to I are by no means exhaustive of the compositions in which the solvents and polyvinyl resins are useful. They are intended to exemplify modifications for different purposes and to suggest to those skilled in the art other similar ways of employing the solutions.

What is claimed is:

1. A composition for use in making photographic films comprising a substantial quantity of high viscosity polyvinyl formal, and cyclic formal of glycol in amount sufficient to dissolve said polyvinyl formal.

2. A composition for use in making photographic films comprising a substantial quantity of high viscosity polyvinyl formal, cyclic formal of glycol in amount sufficient to dissolve said polyvinyl formal, and hydroquinone in amount sufficient to stabilize said polyvinyl formal.

3. A composition for use in making wrapping sheets comprising a substantial quantity of polyvinyl formal, glycol formal in amount sufficient to dissolve said polyvinyl formal, and a plastifier.

4. A composition comprising a substantial quantity of a base selected from the group consisting of polyvinyl acetal, polyvinyl aceto-formal, and polyvinyl formal; and cyclic formal of glycol in sufficient amount to dissolve said base.

5. A coating composition comprising a substantial quantity of a base selected from the group consisting of polyvinyl acetal, polyvinyl aceto-formal, and polyvinyl formal; cyclic formal of glycol in sufficient amount to dissolve said base; and organic solvents of different volatilities compatible with the solution of base and cyclic formal of glycol and present in amounts sufficient to regulate the speed of drying of the composition.

6. A varnish comprising a substantial quantity of a base selected from the group consisting of polyvinyl formal, polyvinyl aceto-formal, and polyvinyl acetal; cyclic formal of glycol in amount sufficient to dissolve said base; and a substantial amount of cellulose acetate.

7. A varnish comprising a substantial quantity of a base selected from the group consisting of polyvinyl formal, polyvinyl aceto-formal, and polyvinyl acetal; cyclic formal of glycol in amount sufficient to dissolve said base; and a substantial amount of a natural resin.

8. A resin composition comprising polyvinyl formal as a resinous ingredient, and a liquid ingredient with a major portion consisting of the cyclic formal of glycol, said polyvinyl formal being present in the ratio of one part by weight to from 0.8 to 6.25 parts by weight of the cyclic formal of glycol.

MAURICE BELLOC.